United States Patent [19]

Nogata et al.

[11] Patent Number: 5,741,848

[45] Date of Patent: Apr. 21, 1998

[54] METHOD OF MANUFACTURING POLYOLEFIN SOLUTIONS

[75] Inventors: Tetsuro Nogata; Kotaro Takita; Kenji Miyasaka; Koichi Kono, all of Kawasaki, Japan

[73] Assignee: Tonen Chemical Corporation, Tokyo, Japan

[21] Appl. No.: 737,205

[22] PCT Filed: Mar. 7, 1996

[86] PCT No.: PCT/JP96/00564

§ 371 Date: Nov. 7, 1996

§ 102(e) Date: Nov. 7, 1996

[87] PCT Pub. No.: WO96/27631

PCT Pub. Date: Dec. 12, 1996

[30] Foreign Application Priority Data

Mar. 8, 1995 [JP] Japan .................................. 7-077230

[51] Int. Cl.[6] .................................................. C08J 3/11
[52] U.S. Cl. .................................................. 524/587
[58] Field of Search .................................................. 524/587

[56] References Cited

U.S. PATENT DOCUMENTS 3,923,947  12/1975  Cook .................................. 528/502 F
4,320,041  3/1982  Mitsubishi .................................. 524/503
4,668,717  5/1987  Stamicarbon .................................. 523/322

FOREIGN PATENT DOCUMENTS 61-143439  7/1986  Japan .................................. C08J 03/04
8-109268  4/1996  Japan .................................. B29B 07/48
8-120093  5/1996  Japan .................................. B29B 07/94

OTHER PUBLICATIONS

International Search Report, Japanese Patent Office, May 14, 1996.

*Primary Examiner*—Thomas R. Weber
*Attorney, Agent, or Firm*—Spencer & Frank

[57] ABSTRACT

A method of manufacturing a polyolefin solution continuously and in a stable manner with a high yield which comprises heading a polyolefin resin with a liquid composed of a solvent for the polyolefin resin, and is characterized in that; (1) a continuous kneader having a self-cleaning action is used, and (2) a starving state is maintained in the internal sections of the header at a polyolefin resin feed section, a liquid feed section, and the section in which the kneading of the polyolefin resin and the liquid is initially carried out.

19 Claims, 4 Drawing Sheets

METHOD OF MANUFACTURING POLYOLEFIN SOLUTIONS

FIELD OF THE INVENTION

The present invention relates to a method of manufacturing a polyolefin solution used for manufacturing microporous polyolefin membranes, polyolefin fibers and the like. More particularly, it relates to a method for continuously manufacturing a solution of polyolefin having a wide molecular distribution range, in a stable manner and with a high output.

BACKGROUND OF THE INVENTION

Polyolefin resins have superior mechanical strength and physical characteristics; therefore, they have been used for various purposes. For example, microporous polyolefin membranes and porous fibers have been used as a separators for batteries, separation films for electrolytic capacitors, precision filters, air filters and the like polyolefin resins are generally manufactured using a polyolefin solution incorporating an advanced flow improver or solvent.

Polyolefin solutions are conventionally manufactured by "batch" type heading, continuous kneading of a polyolefin resin and a liquid, such as mineral oil. In the case of batch type kneading, the polyolefin and the liquid are put into an autoclave equipped with a mixer, the temperature is increased while the mixture is mixed, and the polyolefin and the liquid are kneaded. However, with batch type kneading, kneading takes a rather long, which is a short-coming. In addition, with batch type kneading the residence time differs between the product taken out from the batch at the initial stage and that toward the end. Moreover, the quality within the batch or at the time of switching the batch is not stable. Furthermore, this method is labor intensive, which is another shortcoming. In addition, it is difficult to prepare highly viscous solutions and it is not possible to use high molecular weight compositions in pellet form. This is a further shortcoming.

Therefore, in recent years, a continuous type kneader equipped with a liquid feed section downstream of a resin feed section has been used for manufacturing polyolefin solutions. However, as seen in continous type kneaders of the prior art, the pressure in the kneader at the liquid feed section is higher than the pressure downstream. For that reason, when the quantity of supplied liquid is increased, the kneading of polyolefin cannot be carried out sufficiently, and an upstream liquid back-flow is observed. As a result it is necessary to reduce the feed quantity of liquid. In addition, the amount of shearing exothermic energy is large within the kneader area in which only the polymer exists, and this often results in deterioration of the polymer due to heat.

In view of the above, an object of the present invention is to provide a manufacturing method in which a high yield of polyolefin solution can be continuously obtained in a stable manner.

DISCLOSURE OF THE INVENTION

As a result of continuous research with the above purpose in mind, the present inventors have made the present invention, using a continuous kneader having a self-cleaning effect, and by maintaining a starving state within an internal section of the kneader at a polyolefin resin feed section, a liquid feed section and a kneading section. The present inventors discovered that in this way, a high yield of polyolefin solution having uniform quality can be continuously obtained in a stable manner.

Thus, a method of manufacturing a polyolefin solution according to the present invention comprises kneading a polyolefin resin with a liquid composed of a solvent, and is characterized in that:

(1) a continuous kneader having a self-cleaning action is used, and (2) a starving state is maintained in an internal section of the kneader at a polyolefin resin feed section, a liquid feed section, and a section in which kneading of the polyolefin resin and the liquid is initially carried out.

In addition, a method of manufacturing a polyolefin solution according to the present invention comprises kneading a polyolefin resin and a liquid composed of a solvent, and is characterized in that:

(1) a continuous kneader having a self-cleaning action is used, (2) at least one liquid feed section is placed downstream of a polyolefin resin feed section, and (3) the internal pressure in at least one section of the kneader between the polyolefin resin feed section and a liquid feed section located most upstream is set higher than the internal pressure of the kneader in the liquid feed section located most upstream.

BRIEF DESCRIPTION OF THE DRAWINGS

The invention will be better understood with reference to the following description of a number of preferred embodiments thereof, given in the context of the accompanying drawings, in which.

DETAILED DESCRIPTION OF PREFERRED EMBODIMENTS

The present invention will be described in detail hereafter.

Obtained by polymerizing ethylene, propylene, 1-butene, 4-methyl-1-pentene or 1-hexene or a blend thereof. The copolymer can be, for example, a block copolymer (multi-step polymer), obtained by introducing propylene and ethylene sequentially to a reactor. Among those above, polypropylene, polyethylene and a blend of these are preferable. The polyolefin may be in powder or pellet form.

Among the polyolefin resins, preferred is a polyolefin resin containing a component with a molecular weight of at least $1 \times 10^6$. Examples of polyolefin resins containing a component having a molecular weight of at least $1 \times 10^6$ include crystalline homopolymers and copolymers of ethylene, propylene, 1-butene, 4-methyl-1-pentene, 1-hexene and the like and blends thereof. Among them, preferred is an ultra high molecular weight polyethylene containing at least 5% by weight of a component having a molecular weight of at least $1 \times 10^6$.

As for the polyolefin resin described above, it is desirable that it contains at least 5% by weight (according to the GPC method), more desirably 10% by weight to 90% by weight, of a component having a molecular weight of at least $1 \times 10^6$. In addition, it is desirable that the molecular weight distribution (weight average molecular weight/number average molecular weight) of the polyolefin resin described above, is 5 to 300. When the component having a molecular weight of at least $1 \times 10^6$ is less than 5% by weight, the drawing property of a formed object made from the solution cannot be improved, and it is not possible to obtain a formed object with sufficient strength. In addition, the afore-mentioned range of molecular weight distribution is desirable such that the solution may be easily prepared.

Preferred is a polyolefin resin produced by a reactor blend (multi-step polymerized polyolefin), or a mixture of two or more of such polyolefins. For example, a mixture can be made by blending a polyolefin containing at least 5% by weight of a component having a molecular weight of at least $1 \times 10^6$ with a polyolefin having a molecular weight of at least $1 \times 10^4$ but less than $1 \times 10^6$. A mixture prepared by blending the polyethylene having an ultra high molecular weight described above with high density polyethylene having the molecular weight described above is especially desirable. For example, a reactor blend containing at least 5% by weight of a component having a molecular weight of at least $1 \times 10^6$ and a molecular weight distribution (weight average molecular weight/number average molecular weight) of 5 to 300 can be produced by means of multi-step polymerization. As for the multi-step polymerization method, it is desirable to use a 2-step polymerization method to produce the high molecular weight polymer portion and the low molecular weight polymer portion.

In the manner described above, the polyolefin containing a component having a molecular weight of at least $1 \times 10^6$, more desirably an ultra high molecular weight polyolefin containing at least 5% by weight percent of a component having a molecular weight of at least $1 \times 10^6$, especially ultra high molecular weight polyethylene described previously, or a mixture of the ultra high molecular weight polyethylene and high density polyethylene, is especially desirable as a solution for forming microporous membranes.

It is possible to add various additives, as needed, such as nucleation agent, anti-oxidant, ultra-violet ray absorbing agent, anti-blocking agent, pigment, dye, inorganic filler, anti-bacterial agent, deodorant, far-infrared radiation irradiation agent and the like.

The liquid to be added to the polyolefin resin should have low volatility and should be good solvent for the polyolefin resin. This liquid may be, for example, a low volatile aliphatic or cyclic hydrocarbons such as nonane, decane, decalin, p-xylene, undecane, dodecane, liquid paraffin and the like, or a fraction of mineral oil having a boiling point corresponding to the above.

As for the mixing ratio of the polyolefin resin and the liquid, the quantity of the liquid is 15 parts by weight to 2000 parts by weight, more desirably 20 parts by weight to 1500 parts by weight per 100 parts by weight of the polyolefin resin. When the quantity of the liquid goes over 2000 parts by weight, kneading becomes difficult. On the other hand, when the quantity of the liquid is less than 15 parts by weight, the viscosity is high and the quality deteriorates due to shearing heat at the time of kneading.

The continuous kneader used for manufacturing the polyolefin solution has a self-cleaning action. In the case of the continuous kneader with the self-cleaning action, through a groove section of a screw, a thread ridge of another screw or a protruding section or the like of a cylinder passes, so that the mixture does not rotate with the screw, and it is possible to direct the mixture in a direction in accordance with the thread ridge of the screw or a combination angle of a kneading disk. Therefore, in the case that there is a self-cleaning action; it is possible to keep a liquid feed section and a section in which the kneading of the polyolefin resin and the liquid is initially carried out in a starving state. The self-cleaning action of the kneader does not have to be effective in all sections of the kneaders. It is sufficient that the self-cleaning action is effective in at least a section of the kneader in which the mixture described above exists, so that a liquid feed section and the section in which kneading of the polyolefin resin and the liquid is initially carried out, are kept in the starved state.

In addition, the self-cleaning action in the kneader does not have to be effective in all sections of the kneader. It is enough that the self-cleaning action is effective in at least one section in which the mixture described above exists, so that the pressure in the liquid feed section is 10 kg/cm² or below.

A twin-screw kneader or special single screw header is preferred as the type of continuous kneader described above. Specific examples of such a kneader include a co-rotating twin screw mixer (extruder), a counter-rotating twin screw mixer (extruder), or a special single-screw kneader such as a Bosco kneader and the like. The corotating twin-screw mixer is especially preferred.

On the other hand, in the case of a kneader without a self-cleaning action, even if a thread ridge of the screw is in the direction of feeding, the coefficient of friction between the cylinder and the mixture of polyolefin resin and liquid wherein kneading has not been sufficient is extremely low, and the mixture only rotates with the screw and does not have the capacity to feed the mixture toward the lower stream. Therefore, in the case of a kneader without self-cleaning action, it is not possible to keep the liquid feed section and the section in which the polyolefin resin and the liquid are initially kneaded in a starving state. In addition, in order to move the mixture rotating with this screw downstream, upstream pressure must be increased. For that reason, the pressure is high in kneader without self-cleaning action.

At least one liquid feed section is placed at a polyolefin resin feed section or downstream thereof. The liquid is supplied en route to the kneader in which the polyolefin resin exists, and a solution of polyolefin resin of a uniform concentration is prepared by kneading.

A method of manufacturing a polyolefin solution according to the present invention may be performed wherein a polyolefin resin and a liquid are supplied from the same feed section, or wherein the liquid feed section is placed downstream of the feed section of the polyolefin resin. It is necessary to keep an internal section of the kneader at each feed section in a starving state. In addition, it is necessary to keep the internal section of the kneader wherein the initial liquid and the polyolefin resin are kneaded in a starving state. The starving state means that there exists a space between the cylinder and the screw where the polyolefin resin or a mixture of the liquid with the polyolefin resin does not exist. When such a starving state is realized, the pressure toward the direction of the screw length becomes 0.

In the manner described above, making the pressure 0 makes it possible to transport the mixture of polyolefin resin and liquid which has not yet been well kneaded toward lower stream without creating a backflow of the liquid, even though there is a section where the polyolefin resin is not filled sufficiently upstream of the liquid feed section. The fact that there is no section being filled with only the polyolefin resin means that deterioration of the polyolefin resin does not take place due to shearing heat, even when a polyolefin resin with high viscosity is used.

In addition, in a kneader wherein the liquid feed section is placed at the polyolefin resin feed section and downstream thereof, it is preferred in this case that an extremely large quantity of liquid is supplied, such that at least one internal section of the kneader is filled with the polyolefin resin, between the polyolefin resin feed section and the liquid feed section located most upstream. As described above, in a kneader wherein there is a section filled upstream, it is possible to reduce the pressure in the section filled with only the polyolefin resin, and it is possible to prevent deterioration of the polyolefin resin due to heat.

In other words, if the section located the most upstream of the liquid feed section is maintained in a starving state, a section is created that is of greater pressure than the internal pressure at said liquid feed section. An upstream backflow can be prevented by distributing the pressure in the manner described above, even when the quantity of the liquid is increased. As a result, an increase in yield can be achieved.

In addition, when two or more liquid feed sections are downstream of the polyolefin resin feed section, it is likewise preferred that the internal pressure of at least one section of the kneader between the most upstream liquid feed section and the next downstream liquid feed section be set at a higher value than the internal pressure of the liquid feed section of the kneader located most upstream. Furthermore, it is preferred that the internal pressure of at least one section of the kneader between the liquid feed section most upstream and the liquid feed section located next downstream is greater larger than the internal pressure in the kneader located in the consecutive two liquid feed sections immediately downstream of the polyolefin resin feed section. Doing so is advantageous since the quantity of supplied liquid and the yield can be increased.

The pressure distribution described above can be obtained by changing the shape of the screw of the kneader, the liquid feed location, operation conditions such as screw rotation number or by any other suitable means.

The method of manufacturing a polyolefin solution according to the present invention can be characterized in that a specific pressure distribution is maintained in the kneader. The pressure in the kneader is the average of the pressure in the internal section of the kneader over a constant time interval, this constant time internal being sufficiently long to average out the changes in pressure attributable a rotation of the screw of the kneader.

To achieve the desired pressure distribution, at least one section of the kneader located between the polyolefin resin feed section and the most upstream liquid feed is kept at a higher pressure than the pressure of the most upstream liquid feed. In other words, a section having greater pressure than the internal pressure of the liquid feed section is maintained upstream of the most upstream liquid feed. By establishing the pressure distribution in the manner described above, it is possible to prevent a backflow toward the upstream side of the kneader, even though the quantity of added liquid is increased. As a result, the yield can be increased.

In addition, when two or more liquid feed sections are used for the same reason it is desirable to maintain a higher pressure in at least one section in the kneader between the liquid feed section and the feed section located immediately downstream than the inner pressure of the liquid feed section located immediately downstream. Furthermore, it is desirable to maintain a higher pressure in at least one section in the kneader between each of the liquid feed section and the feed section located immediately downstream than the inner pressure of the two liquid feed sections described above. Doing so is an advantage that the liquid feed quantity and the yield can be increased.

In addition, it is desirable that the pressure in the kneader at the liquid feed section located most upstream is set at less than 10 kg/cm$^2$ (gauge pressure). In order to provide shearing to the polyolefin resin along with high viscosity, the section upstream of the most upstream liquid feed section with (filled only the polyolefin) is reduced to the minimum by setting the pressure in the kneader within the range described above, and as a result, the shearing heat is controlled and deterioration due to heat can be prevented.

The pressure distribution described above can be obtained by changing the shape of the screw of the kneader or by any other suitable method.

It is desirable that the kneading temperature be set from the melting point of a polyolefin to 250° C., preferably from the melting point of a polyolefin +10° C. to 220° C. If the kneading temperature is less than the melting point of a polyolefin, sufficient kneading cannot be carried out; if the kneading temperature is higher than 250° C., deterioration of the polyolefin resin takes place.

In the present invention, it is possible to make the pressure at the liquid feed section zero by creating a starving state in the internal section of the kneader at the polyolefin resin feed section and the liquid feed section and the initial kneading section. As a result, it is possible to obtain a uniform high yield of polyolefin solution, without creating a back flow of the liquid, even though there is no section filled with only the polyolefin resin upstream of the liquid feed section. In addition, when there is a section filled with the polyolefin resin upstream of the most upstream liquid feed section, it is possible to reduce the pressure. Deterioration due to heat can be prevented at the section filled with the polyolefin resin alone, and at the same time, a large quantity of the liquid can be supplied.

Thus, the method of the present invention makes it is possible to obtain a uniform high yield of polyolefin solution by creating a specific distribution of the internal pressure in the kneader.

EXAMPLES

The present invention will be described further in detail by way of the following examples. However, the present invention is not limited to the Examples.

In examples 1 through 16, the polyolefin resins and liquids were kneaded in the mixing ratios shown in Table 1, using a co-rotating twin screw mixer(extruder), TEX-54 (manufactured by The Japan Steel Works, Ltd; screw diameter=58 mm, L/D ratio=42). In addition, the screw shape of the extruder was selected so that a preferred pressure distribution could be obtained. Pressure meters were placed at 14 locations in the internal section of the kneader. FIGS. 1 through 5 show the locations of the pressure meters in the internal section of the extruder and the liquid feed positions, and the relationship of each example to the Figures is shown in Table 1. The distance from the pressure meter 1 to left end of the extruder 20 was 236 mm, and the distance between each adjacent pressure meter was 94.5 mm. The die attached to the extruder contains a slit having a thickness of 3 mm and a width of 104 mm. Table 1 shows the polyolefin resin and the liquid used, and the quantity of supplied liquid for the polyolefin resin 100 parts by weight. In addition, the quantity (shown with parts by weight for the polyolefin of 100 parts by weight) of the liquid supplied from each of the liquid feed holes and the pressure in the internal section of the extruder and operation conditions are shown in Table 2. The pressure value shown in Table 2 was the value ($kg/cm^2$, gage pressure) if the atmospheric pressure was set as zero. As shown in Table 1, an extruder of a different structural type was used for each Example.

In addition, after the measurement of the pressure in the extruder, the pressure meters of the polyolefin feed section or the liquid feed section located most upstream and the pressure meter located at the place immediately downstream were removed, and several grains of the polyolefin resin (PE) pellet were dropped into the holes where the pressure meters had been removed. The PE pellets went into the internal section of the extruder immediately. Therefore, it was clear that the polyolefin feed section, the liquid feed section being located most upstream and the location of the pressure meter located at the immediately downstream were in a starved state. In addition, the screw located in the space between the polyolefin feed section and the first pressure meter immediately downstream, or in the space between the most upstream liquid feed section and the pressure meter located immediately downstream, was the kneading section used to carry out the kneading of the polyolefin resin and the liquid. In addition, Examples 6 through 16 show that the pressure value ($kg/cm^2$, gage pressure) at the pressure meter located immediately upstream of the most upstream liquid feed section was over zero, such that the internal section of the extruder was filled. The polyolefin solution, obtained in the above manner, was formed into a 2 mm-thick sheet using the press forming die. The sheet obtained looked superior in its appearance. In addition, the sheet was drawn with a simultaneous two-axis, using a batch type rolling mill, and it became clear that it was possible to draw in the scale of more than 2×2 for all.

In comparative examples 1 through 6, the polyolefin resins and liquids shown in Table 1 were kneaded using the co-rotating twin screw mixer (extruder), TEX-54, as for Example 1. In addition, the screw shape of the extruder was selected so that the preferred pressure distribution could be obtained. The pressure meters were placed in the same manner as those of Example 1. The locations of the pressure meter and the liquid feed section are shown in FIG. 1, FIG. 3, FIG. 4, and FIG. 6, and the relationship of each Comparative Example to the Figures to are shown in Table 1.

Table 2 shows the internal pressure of the extruder and the operation conditions. As shown in Table 2, as for the Comparative Examples, the value of the pressure was over zero at the location immediately downstream of the polyolefin resin feed section, or the liquid feed section located most upstream. At the location of the pressure meter immediately downstream, it shows that the internal section of the extruder was filled, and it was not in a starving state. However the pressure value shown in Table 2 was the value when the atmospheric pressure was zero ($kg/cm^2$, gage pressure). The operation conditions shown in Table 2 were the conditions when the stable production was achieved and maxium yield was realized.

In comparative examples 1 through 4, when the yield was increased, the following phenomena were observed: the variation became large and the liquid not being kneaded jetted out intermittently.

The polyolefin solution the comparative examples 5 and 6 was formed into a sheet of 2 mm in thickness, using a press forming die. The color of the sheet was changed to yellow. Subsequently, this sheet was drawn with a simultaneous two-axis, using a batch type rolling mill. However, it was torn in all experimental conditions.

TABLE 1

Figure 1:
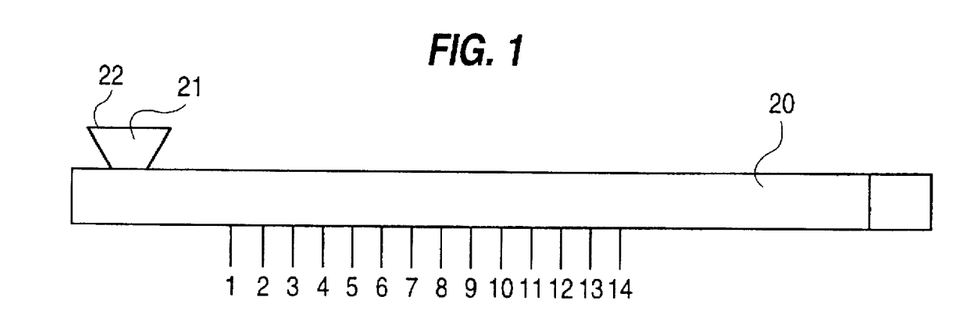
FIG. 1 is a schematic diagram showing a first arrangement of the location of a pressure meter in an extruder and the location of the liquid feed section.
Figure 2:
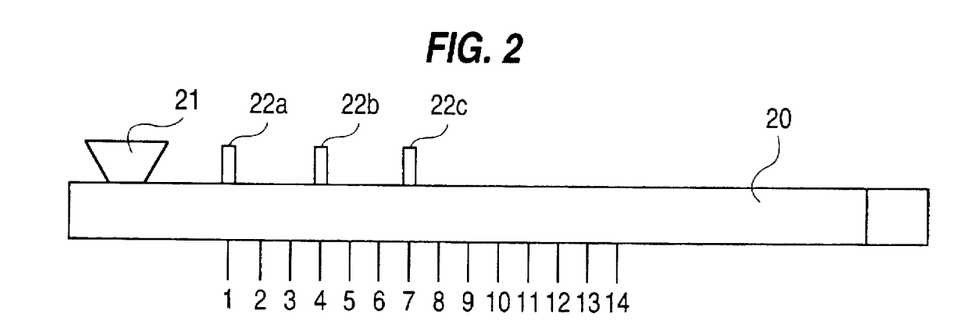
FIG. 2 is a schematic diagram showing a second arrangement of the location of a pressure meter in an extruder and the location of the liquid feed section.
Figure 3:
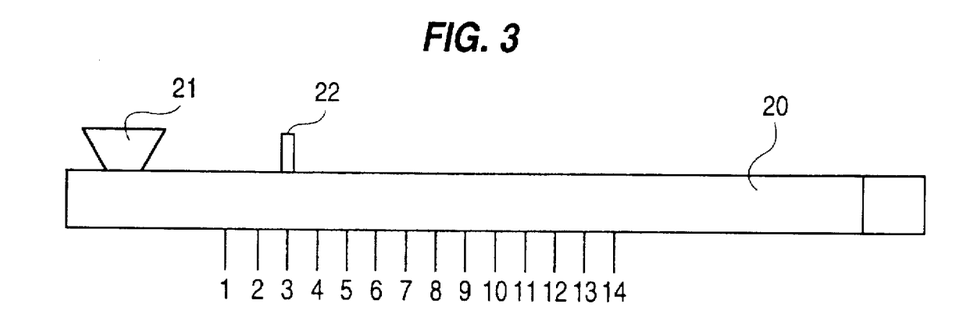
FIG. 3 is a schematic diagram showing a third arrangement of the location of a pressure meter in an extruder and the location of the liquid feed section.
Figure 4:
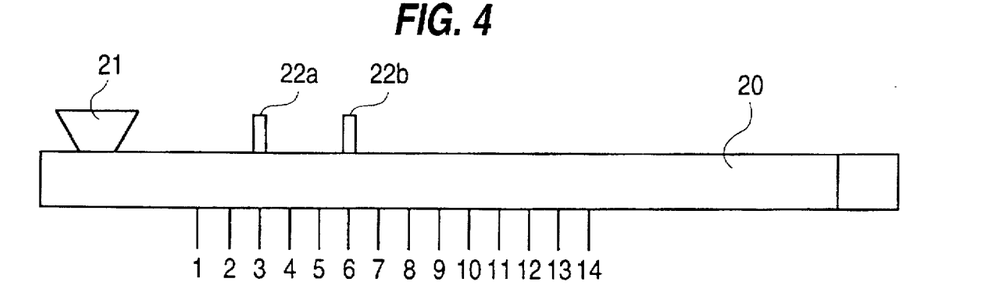
FIG. 4 is a schematic diagram showing a fourth arrangement of the location of a pressure meter in an extruder and the location of the liquid feed section.
Figure 5:
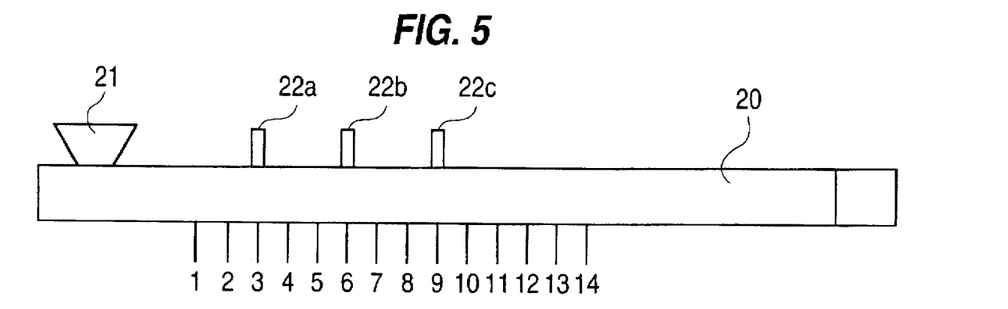
FIG. 5 is a schematic diagram showing a fifth arrangement of the location of a pressure meter in an extruder and the location of the liquid feed section.
Figure 6:
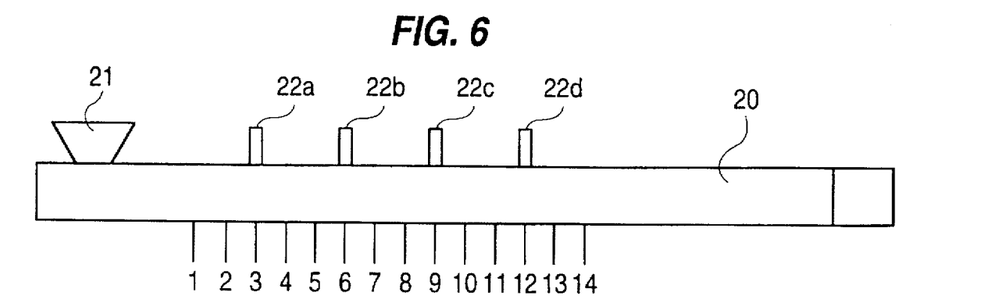
FIG. 6 is a schematic diagram showing a sixth arrangement of the location of a pressure meter in an extruder and the location of the liquid feed section.
Figure 7:
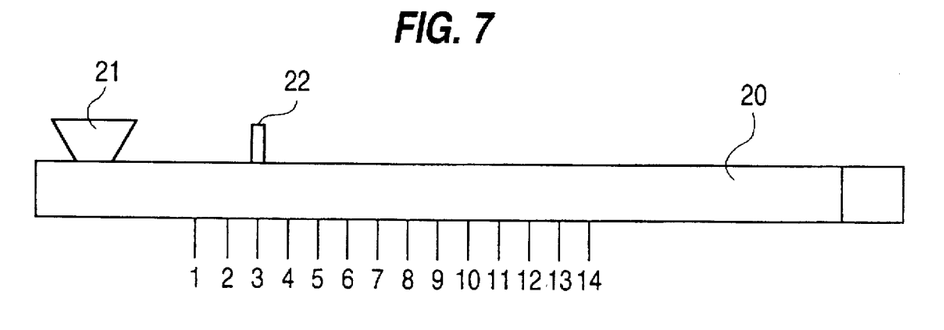
FIG. 7 is a schematic diagram showing a seventh arrangement of the location of a pressure meter in an extruder and the location of the liquid feed section.
Figure 8:
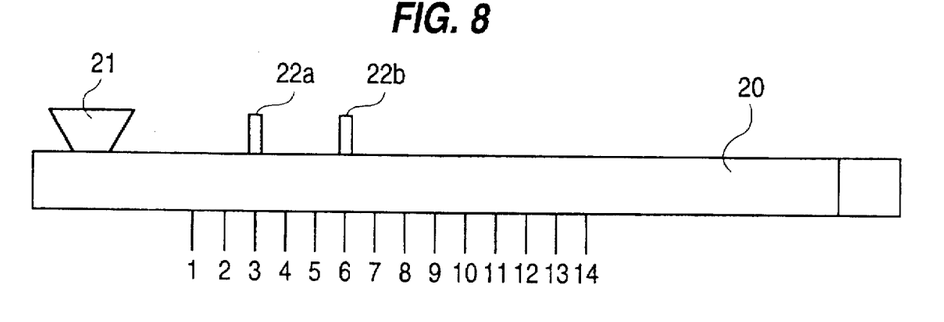
FIG. 8 is a schematic diagram showing an eighth arrangement of the location of a pressure meter in an extruder and the location of the liquid feed section.
Figure 9:
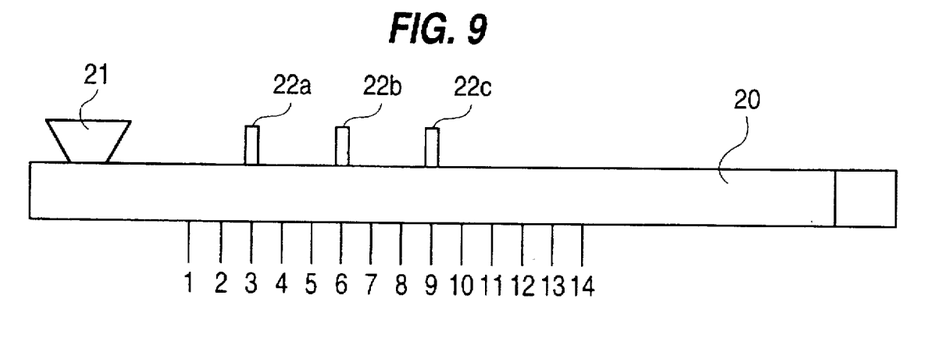
FIG. 9 is a schematic diagram showing a ninth arrangement of the location of a pressure meter in an extruder and the location of the liquid feed section.
Figure 10:
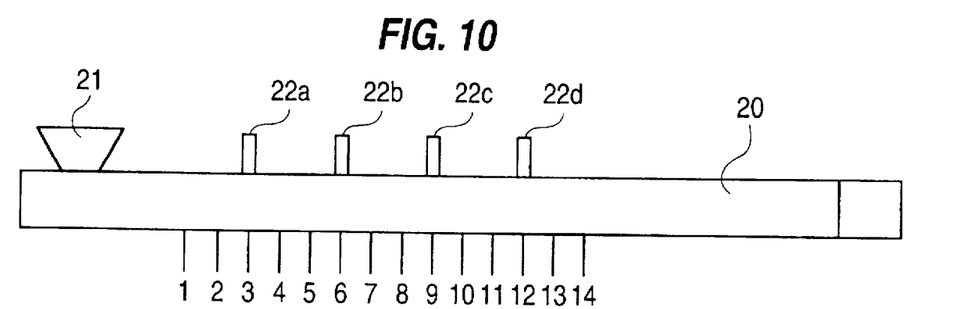
FIG. 10 is a schematic diagram showing a tenth arrangement of the location of a pressure meter in an extruder and the location of the liquid feed section; In the drawings, the numerals 1 through 14 indicate a pressure meter, the numeral 20 indicates an extruder, the numeral 21 indicates a polyolefin feed section and the numeral 22 indicates a liquid feed section.

| No. | Polyolefin Resin | Liquid | Quantity of Supplied Liquid[1] | Types of the Extruder |
|---|---|---|---|---|
| Examples | | | | |
| 1 | PE-1[2] | Liquid Parafin[8] | 30 | FIG. 1 |
| 2 | PE-2[3] | " | 30 | FIG. 1 |
| 3 | PE-1 | " | 500 | FIG. 2 |
| 4 | PE-2 | " | 500 | FIG. 2 |
| 5 | PE-2 | " | 500 | FIG. 2 |
| 6 | PE-1 | " | 150 | FIG. 3 |
| 7 | PE-2 | " | 150 | FIG. 3 |
| 8 | PE-1 | " | 500 | FIG. 4 |
| 9 | PE-2 | " | 500 | FIG. 4 |
| 10 | PE-1 | " | 1200 | FIG. 5 |
| 11 | PE-2 | " | 1200 | FIG. 5 |
| 12 | PE-3[4] | " | 500 | FIG. 5 |
| 13 | PE-4[5] | " | 500 | FIG. 5 |
| 14 | PE-5[6] | " | 500 | FIG. 4 |
| 15 | PP[7] | " | 300 | FIG. 3 |
| 16 | PP | " | 1200 | FIG. 4 |
| Comparative Examples | | | | |
| 1 | PE-1 | " | 30 | FIG. 1 |
| 2 | PE-2 | " | 30 | FIG. 1 |
| 3 | PE-1 | " | 150 | FIG. 6 |
| 4 | PE-2 | " | 150 | FIG. 6 |
| 5 | PE-2 | " | 500 | FIG. 4 |
| 6 | PP | " | 300 | FIG. 3 |

Note: [1]Quantity of supplied liquid: Parts by weight of the liquid for the 100 parts by weight of the polyolefin resin
[2]PE-1: Weight average molecular weight $3.7 \times 10^5$ powder-form polyethylene (PE)
[3]PE-2: Weight average molecular weight $2.0 \times 10^6$ powder-form polyethylene (PE) and Weight average molecular weight $3.7 \times 10^5$ powder-form polyethylene (PE) were blended using 3:14 ratio. (Component of the molecular weight of $1 \times 10^6$ and over according to the GPC method, 21.6% by weight percent)
[4]PE-3: Weight average molecular weight $3.7 \times 10^5$ pellet-form PE.
[5]PE-4: Weight average molecular weight $2.0 \times 10^6$ powder-form polyethylene (PE) and Weight average molecular weight $3.7 \times 10^5$ pellet-form polyethylene (PE), are blended using 3:14 ratio. (Component of the molecular weight of $1 \times 10^6$ and over according to the GPC method, 21.6% by weight)
[6]PE-5: Weight average molecular weight $2 \times 10^6$ powder-form polyethylene
[7]PP: Weight average molecular weight $3.9 \times 10^4$ pellet-form polypropylene, to which sorbitol-based nucleation agent was added by 1 part by weight.
[8]Liquid paraffin: Kinematic viscosity at 40° C. is 64 cSt.

TABLE 2

Feed Quantity of the Liquid, Internal Pressure in the Extruder, and the Operation Conditions

| | | Polyolefin Resin Feed Hole | Position on the Extruder | | | | | | | | | | | | | | Cylinder Temp. °C. | Screw Rotation Number rpm | Yield kg/h |
| | | | 1 | 2 | 3 | 4 | 5 | 6 | 7 | 8 | 9 | 10 | 11 | 12 | 13 | 14 | | | |
|---|---|---|---|---|---|---|---|---|---|---|---|---|---|---|---|---|---|---|---|
| Example 1 | Liquid Feed Quantity | 30 | — | — | — | — | — | — | — | — | — | — | — | — | — | — | 150–200 | 100 | 80 |
| | Pressure in the Internal of the Extruder | | 0.0 | 0.0 | 0.0 | 0.0 | 0.0 | 0.0 | 0.0 | 0.0 | 0.0 | 0.0 | 0.0 | 0.0 | 0.0 | 0.0 | | | |
| Example 2 | Liquid Feed Quantity | 30 | — | — | — | — | — | — | — | — | — | — | — | — | — | — | 150–200 | 100 | 40 |
| | Pressure in the Internal of the Extruder | | 0.0 | 0.0 | 0.0 | 0.0 | 0.0 | 0.0 | 0.0 | 0.0 | 0.0 | 0.0 | 0.0 | 0.0 | 0.0 | 0.0 | | | |
| Example 3 | Liquid Feed Quantity | — | 80 | 0.0 | 0.0 | 180 | 0.0 | 0.0 | 240 | 0.0 | 0.0 | 0.0 | 0.0 | 0.0 | 0.0 | 0.0 | 150–200 | 350 | 90 |
| | Pressure in the Internal of the Extruder | | 0.0 | 0.0 | 0.0 | 0.0 | 0.0 | 0.0 | 0.0 | 0.0 | 0.0 | 0.0 | 0.0 | 0.0 | 0.0 | 0.0 | | | |
| Example 4 | Liquid Feed Quantity | — | 50 | 0.0 | 0.0 | 180 | 0.0 | 0.0 | 270 | 0.0 | 0.0 | 0.0 | 0.0 | 0.0 | 0.0 | 0.0 | 150–200 | 350 | 100 |
| | Pressure in the Internal of the Extruder | | 0.0 | 0.0 | 2.6 | 1.4 | 1.0 | 8.9 | 7.8 | 7.8 | 6.0 | 5.1 | 4.0 | 2.1 | 0.2 | 0.0 | | | |
| Example 5 | Liquid Feed Quantity | — | 80 | 0.0 | 0.0 | 180 | 0.0 | 0.0 | 240 | 0.0 | 0.0 | 0.0 | 0.0 | 0.0 | 0.0 | 0.0 | 150–200 | 350 | 60 |
| | Pressure in the Internal of the Extruder | | 0.0 | 0.0 | 0.0 | 0.0 | 0.0 | 0.0 | 0.0 | 0.0 | 0.0 | 0.0 | 0.0 | 0.0 | 0.0 | 0.0 | | | |
| Example 6 | Liquid Feed Quantity | — | 0.0 | 2.1 | 150 | 0.0 | 0.0 | 0.0 | 0.0 | 0.0 | 0.0 | 0.0 | 0.0 | 0.0 | 0.0 | 0.0 | 150–200 | 200 | 200 |
| | Pressure in the Internal of the Extruder | | 0.0 | 0.0 | 0.0 | 0.0 | 0.0 | 0.0 | 0.0 | 0.0 | 0.0 | 0.0 | 0.0 | 0.0 | 0.0 | 0.0 | | | |
| Example 7 | Liquid Feed Quantity | — | 1.4 | 0.0 | 150 | 0.0 | 0.0 | 0.0 | 0.0 | 0.0 | 0.0 | 0.0 | 0.0 | 0.0 | 0.0 | 0.0 | 150–200 | 200 | 100 |
| | Pressure in the Internal of the Extruder | | 0.0 | 0.0 | 0.0 | 0.0 | 0.0 | 370 | 0.0 | 0.0 | 0.0 | 0.0 | 0.0 | 0.0 | 0.0 | 0.0 | | | |
| Example 8 | Liquid Feed Quantity | — | 0.0 | 1.9 | 130 | 0.0 | 15.0 | 10.1 | 9.9 | 9.6 | 8.6 | 7.4 | 5.7 | 5.1 | 3.6 | 0.8 | 150–200 | 350 | 200 |
| | Pressure in the Internal of the Extruder | | 0.0 | 0.0 | 0.0 | 0.0 | 0.0 | 370 | 0.0 | 0.0 | 0.0 | 0.0 | 0.0 | 0.0 | 0.0 | 0.0 | | | |
| Example 9 | Liquid Feed Quantity | — | 0.0 | 0.9 | 130 | 0.0 | 11.2 | 10.2 | 9.8 | 9.5 | 8.2 | 7.4 | 6.0 | 4.6 | 3.6 | 1.8 | 150–200 | 350 | 100 |
| | Pressure in the Internal of the Extruder | | 0.0 | 0.0 | 0.0 | 0.0 | 0.0 | 280 | 0.0 | 0.0 | 780 | 0.0 | 0.0 | 0.0 | 0.0 | 0.0 | | | |
| Example 10 | Liquid Feed Quantity | — | 0.0 | 0.0 | 140 | 0.0 | 2.2 | 0.9 | 0.7 | 20.1 | 15.3 | 15.0 | 14.2 | 13.4 | 8.0 | 3.1 | 150–200 | 600 | 200 |
| | Pressure in the Internal of the Extruder | | 0.0 | 0.0 | 0.0 | 0.0 | 0.0 | 280 | 0.0 | 0.0 | 780 | 0.0 | 0.0 | 0.0 | 0.0 | 0.0 | | | |
| Example 11 | Liquid Feed Quantity | — | 0.0 | 0.4 | 140 | 0.0 | 2.4 | 1.1 | 0.8 | 11.5 | 10.2 | 10.0 | 8.9 | 5.9 | 3.0 | 0.8 | 150–200 | 600 | 100 |
| | Pressure in the Internal of the Extruder | | 0.0 | 0.0 | 0.0 | 0.0 | 0.0 | 200 | 0.0 | 0.0 | 200 | 0.0 | 0.0 | 0.0 | 0.0 | 0.0 | | | |
| Example 12 | Liquid Feed Quantity | — | 0.0 | 2.5 | 100 | 0.0 | 5.3 | 2.6 | 0.7 | 15.3 | 10.2 | 10.0 | 9.5 | 8.1 | 4.9 | 2.9 | 150–200 | 350 | 150 |
| | Pressure in the Internal of the Extruder | | 0.0 | 0.0 | 0.0 | 0.0 | 0.0 | 180 | 0.0 | 0.0 | 240 | 0.0 | 0.0 | 0.0 | 0.0 | 0.0 | | | |
| Example 13 | Liquid Feed Quantity | — | 0.0 | 1.4 | 80 | 0.0 | 2.6 | 1.8 | 0.7 | 5.5 | 4.4 | 4.3 | 4.2 | 4.0 | 3.6 | 3.9 | 150–200 | 350 | 80 |
| | Pressure in the Internal of the Extruder | | 0.0 | 0.2 | 130 | 0.0 | 1.1 | 370 | 0.3 | 0.2 | 0.1 | 0.0 | 0.0 | 0.0 | 0.0 | 0.0 | | | |
| Example 14 | Liquid Feed Quantity | — | 0.0 | 1.4 | 300 | 0.0 | 0.0 | 0.5 | 0.0 | 0.0 | 0.0 | 0.0 | 0.0 | 0.0 | 0.0 | 0.0 | 150–200 | 250 | 50 |
| | Pressure in the Internal of the Extruder | | 0.0 | 0.2 | 0.0 | 0.0 | 0.0 | 0.0 | 0.0 | 0.0 | 0.0 | 0.0 | 0.0 | 0.0 | 0.0 | 0.0 | | | |
| Example 15 | Liquid Feed Quantity | — | 0.0 | 1.4 | 230 | 0.0 | 3.9 | 2.3 | 2.1 | 1.2 | 0.8 | 1.3 | 9.8 | 5.6 | 4.9 | 12.9 | 150–200 | 150 | 200 |
| | Pressure in the Internal of the Extruder | | 0.0 | 1.0 | 0.0 | 0.0 | 0.0 | 970 | 0.0 | 0.0 | 0.0 | 0.0 | 0.0 | 14.0 | 13.6 | 0.0 | | | |
| Example 16 | Liquid Feed Quantity | — | 0.0 | 1.0 | 0.0 | 0.0 | 3.9 | 2.3 | 2.1 | 1.2 | 0.8 | 1.3 | 9.8 | 5.6 | 4.9 | 3.1 | 150–200 | 600 | 200 |
| | Pressure in the Internal of the Extruder | | 6.8 | 6.3 | 5.3 | 4.9 | 3.3 | 2.5 | 0.6 | 0.0 | 0.0 | 0.0 | 0.0 | 0.0 | 0.0 | 0.0 | | | |
| Comparative Example 1 | Liquid Feed Quantity | 30 | — | — | — | — | — | — | — | — | — | — | — | — | — | — | 150–200 | 100 | 4 |
| | Pressure in the Internal of the Extruder | | 1.1 | 4.5 | 8.6 | 4.8 | 2.9 | 1.4 | 0.0 | 0.0 | 0.0 | 0.0 | 0.0 | 0.0 | 0.0 | 0.0 | | | |
| Comparative Example 2 | Liquid Feed Quantity | 30 | — | — | 30 | — | — | 35 | — | — | 40 | — | — | 45 | — | — | 150–200 | 100 | 2 |
| | Pressure in the Internal of the Extruder | | 0.0 | 0.4 | 4.3 | 5.6 | 1.1 | 15.3 | 18.1 | 0.6 | 16.7 | 17.5 | 1.5 | 30.7 | 34.3 | 29.7 | | | |
| Comparative Example 3 | Liquid Feed Quantity | — | — | — | 80 | — | — | 35 | — | — | 40 | — | — | 45 | — | — | 150–200 | 200 | 10 |
| | Pressure in the Internal of the Extruder | | 0.0 | 0.0 | 2.4 | 4.1 | 0.0 | 10.3 | 15.2 | 0.4 | 13.2 | 14.1 | 0.2 | 22.5 | 30.1 | 25.1 | | | |
| Comparative Example 4 | Liquid Feed Quantity | — | | | | | | | | | | | | | | | 150–200 | 200 | 8 |
| | Pressure in the Internal of the Extruder | | | | | | | | | | | | | | | | | | |

TABLE 2-continued

Feed Quantity of the Liquid, Internal Pressure in the Extruder, and the Operation Conditions

| | Polyolefin Resin Feed Hole | 1 | 2 | 3 | 4 | 5 | 6 | 7 | 8 | 9 | 10 | 11 | 12 | 13 | 14 | Cylinder Temp. °C. | Screw Rotation Number rpm | Yield kg/h |
|---|---|---|---|---|---|---|---|---|---|---|---|---|---|---|---|---|---|---|
| Comparative Example 5 Liquid Feed Quantity | — | — | — | 130 | — | — | 370 | — | — | — | — | — | — | — | — | 150–200 | 350 | 100 |
| Comparative Example 5 Pressure in the Internal of the Extruder | — | 1.7 | 15.2 | 11.2 | 8.5 | 40.6 | 31.2 | 30.1 | 25.3 | 23.5 | 20.1 | 16.7 | 13.1 | 10.1 | 6.7 | | | |
| Comparative Example 6 Liquid Feed Quantity | — | — | — | 300 | — | — | — | — | — | — | — | — | — | — | — | 150–200 | 150 | 200 |
| Comparative Example 6 Pressure in the Internal of the Extruder | — | 6.5 | 32.5 | 12.5 | 11.3 | 9.9 | 8.5 | 7.3 | 6.0 | 4.1 | 2.9 | 0.8 | 5.2 | 15.3 | 10.3 | | | |

In examples 17 through 33, the polyolefin resins and liquids shown in Table 3, were kneaded using the co-rotating twin screw mixer(extruder),TEX-54 (manufactured by The Japan Steel Works Ltd.; screw diameter=58 mm, L/D ratio= 42). The screw shape of the extruder was selected so that a preferred pressure distribution could be obtained. The pressure meters were placed at 14 locations of the internal section of the kneader. FIGS. 7 through 10 show the locations of the pressure meters in the internal section of the extruder and the liquid feed positions, and the relationship of each example to the Figures is shown in Tables 4 and 6. The distance from the pressure meter 1 to left end of the extruder 20 was 142 mm, and the distance between each pressure meter adjoining was 94.5 mm.

Tables 4 and 6 show the operation conditions, and Tables 5 and 7 show the pressure distribution being measured. The pressure values shown in Table 5 and Table 7 were the value (gauge pressure) at the time when the atmospheric pressure was set as zero. The operation conditions shown in Table 4 and Table 6 were the conditions at the time when a stable and maximum yield was achieved.

The polyolefin solution obtained in the above manner, is formed into a 2 mm-thick sheet using a press forming die. The sheet obtained looked superior in its appearance. In addition, the sheet was drawn in simultaneous two-axis, using a batch type rolling mill, and it was clear that it was possible to draw in the scale of more than 2×2 for all.

In comparative examples 7 through 12, the polyolefin resins and liquids shown in Table 3 were kneaded using co-rotating twin screw mixer (extruder), TEX-54, as for Example 17. In addition, the screw shape of the extruder was selected so that a preferred pressure distribution could be obtained. The pressure meters were placed in the same manner as those of Example 17. The locations of the pressure meters and the locations of the liquid feed sections are shown in FIG. 7 through FIG. 10, and the relationship of each Comparative Example to the Figures is shown in Table 4 and Table 6.

Table 4 and Table 6 show the operation conditions, and Table 5 and Table 7 show the pressure distribution being measured. The operation conditions were the conditions at the time when stable and maximum yield was observed.

In Comparative Examples 7, 8, 10 and 11, when the yield was increased, the following phenomena were observed: the variation became large and the liquid not being kneaded jetted out intermittently.

In addition, the polyolefin solutions in comparative examples 9 and the 12 were formed into a 2 mm-thick sheet, using a press forming die, and were drawn in simultaneous two-axis, using the batch type rolling mill. However, these sheets were torn in all experimental conditions.

TABLE 3

| No. | Polyolefin Resin | Liquid | Quantity of Supplied Liquid[1] |
| --- | --- | --- | --- |
| Examples | | | |
| 17 | PE-1[2] | Liquid Parafin[8] | 500 |
| 18 | PE-1 | " | 500 |
| 19 | PE-1 | " | 30 |
| 20 | PE-1 | " | 150 |
| 21 | PE-1 | " | 500 |
| 22 | PE-1 | " | 1200 |
| 23 | PE-3[4] | " | 500 |
| 24 | PP[7] | " | 300 |
| 25 | PP | " | 1200 |
| 26 | PE-2[3] | " | 500 |
| 27 | PE-2 | " | 500 |
| 28 | PE-2 | " | 30 |
| 29 | PE-2 | " | 150 |
| 30 | PE-2 | " | 500 |
| 31 | PP-2 | " | 1200 |
| 32 | PE-4[5] | " | 500 |
| 33 | PE-5[6] | " | 500 |
| Comparative Examples | | | |
| 7 | PE-1 | " | 30 |
| 8 | PE-1 | " | 150 |
| 9 | PP | " | 150 |
| 10 | PE-2 | " | 30 |
| 11 | PE-2 | " | 150 |
| 12 | PE-2 | " | 500 |

Note : (1) through (8) are the same as those of the Table 1.

TABLE 4

Feed Quantity of Liquid[1] and the Operation Conditions of the Kneader

| | Position on the Kneader[2] | | | | | | | | | | | | | | Cylinder Temp. °C. | Screw Rotation Number rpm | Yield kg/h |
| --- | --- | --- | --- | --- | --- | --- | --- | --- | --- | --- | --- | --- | --- | --- | --- | --- | --- |
| | 1 | 2 | 3 | 4 | 5 | 6 | 7 | 8 | 9 | 10 | 11 | 12 | 13 | 14 | | | |
| Example 17 | — | — | 220 | — | — | 140 | — | — | 140 | — | — | — | — | — | 150–200 | 200 | 80 |
| Example 18 | — | — | 160 | — | — | 170 | — | — | 170 | — | — | — | — | — | 150–200 | 350 | 100 |
| Example 19 | — | — | 30 | — | — | — | — | — | — | — | — | — | — | — | 150–200 | 100 | 100 |
| Example 20 | — | — | 150 | — | — | — | — | — | — | — | — | — | — | — | 150–200 | 200 | 200 |
| Example 21 | — | — | 130 | — | — | 370 | — | — | — | — | — | — | — | — | 150–200 | 350 | 200 |
| Example 22 | — | — | 140 | — | — | 280 | — | — | 780 | — | — | — | — | — | 150–200 | 600 | 200 |
| Example 23 | — | — | 60 | — | — | 130 | — | — | 310 | — | — | — | — | — | 150–200 | 350 | 160 |
| Example 24 | — | — | 300 | — | — | — | — | — | — | — | — | — | — | — | 150–200 | 150 | 200 |
| Example 25 | — | — | 230 | — | — | 970 | — | — | — | — | — | — | — | — | 150–200 | 600 | 200 |
| Comparative Example 7 | — | — | 30 | — | — | — | — | — | — | — | — | — | — | — | 150–200 | 100 | 5 |

TABLE 4-continued

Feed Quantity of Liquid[(1)] and the Operation Conditions of the Kneader

| | Position on the Kneader[(2)] | | | | | | | | | | | | | | Cylinder Temp. °C. | Screw Rotation Number rpm | Yield kg/h |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | | | |
| Comparative Example 8 | — | — | 30 | — | — | 35 | — | — | 40 | — | — | 45 | — | — | 150~200 | 200 | 10 |
| Comparative Example 9 | — | — | 30 | — | — | 35 | — | — | 40 | — | — | 45 | — | — | 150~200 | 200 | 15 |

Note:
[(1)]Feed quantity of liquid: Parts by weight of the liquid for the polyolefin resin 100 parts by weight.
[(2)]Position in the Kneader: The numericals 1 through 14 indicate the location positions of pressure meters shown in FIG. 7 through FIG. 10.

TABLE 5

Internal Pressure in the Kneader (kg/cm$^2$)

| | Position on the Kneader[(1)] | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Example 17 | 0.0 | 15.2 | 10.1 | 8.6 | 2.1 | 0.0 | 0.0 | 0.0 | 0.0 | 0.0 | 0.0 | 0.0 | 0.0 | 0.0 |
| Example 18 | 0.0 | 5.1 | 0.0 | 0.0 | 0.0 | 0.0 | 0.0 | 0.0 | 0.0 | 0.0 | 0.0 | 0.0 | 0.0 | 0.0 |
| Example 19 | 0.0 | 19.3 | 15.3 | 11.2 | 9.6 | 7.2 | 4.0 | 1.8 | 0.0 | 0.0 | 0.0 | 0.0 | 0.0 | 0.0 |
| Example 20 | 0.0 | 10.9 | 8.6 | 8.4 | 8.2 | 8.0 | 7.5 | 6.7 | 5.2 | 3.9 | 2.4 | 0.8 | 0.0 | 0.0 |
| Example 21 | 0.0 | 9.1 | 4.8 | 2.2 | 20.1 | 15.4 | 15.0 | 14.2 | 13.5 | 12.1 | 11.1 | 9.8 | 8.4 | 7.2 |
| Example 22 | 0.0 | 0.8 | 0.0 | 0.0 | 9.5 | 5.3 | 4.2 | 25.2 | 18.3 | 18.0 | 17.6 | 17.1 | 16.6 | 15.9 |
| Example 23 | 0.0 | 10.3 | 6.3 | 2.4 | 25.6 | 20.3 | 5.6 | 26.5 | 19.6 | 18.5 | 17.3 | 16.4 | 15.0 | 12.4 |
| Example 24 | 0.0 | 9.4 | 6.8 | 6.8 | 6.5 | 6.3 | 5.9 | 5.5 | 5.0 | 4.6 | 4.0 | 3.2 | 1.6 | 0.2 |
| Example 25 | 0.0 | 3.3 | 1.1 | 0.0 | 13.3 | 9.3 | 9.3 | 9.3 | 9.2 | 9.2 | 9.0 | 8.5 | 7.8 | 6.8 |
| Comparative Example 7 | 0.0 | 2.5 | 8.2 | 11.1 | 7.2 | 4.2 | 0.9 | 0.0 | 0.0 | 0.0 | 0.0 | 0.0 | 0.0 | 0.0 |
| Comparative Example 8 | 0.0 | 0.4 | 4.3 | 5.6 | 1.1 | 15.3 | 18.1 | 0.6 | 16.7 | 17.5 | 1.5 | 30.7 | 34.3 | 29.7 |
| Comparative Example 9 | 0.0 | 0.0 | 3.1 | 4.3 | 0.3 | 10.5 | 12.2 | 0.1 | 12.3 | 14.2 | 0.9 | 25.3 | 28.7 | 24.3 |

Note:
[(1)]Position in the kneader: The numericals 1 through 14 indicate location positions of pressure meters shown in FIG. 7 through FIG. 10.

TABLE 6

Feed Quantity of Liquid[(1)] and the Operation Conditions of the Kneader

| | Position on the Kneader[(2)] | | | | | | | | | | | | | | Cylinder Temp. °C. | Screw Rotation Number rpm | Yield kg/h |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | | | |
| Example 26 | — | — | 220 | — | — | 140 | — | — | 140 | — | — | — | — | — | 150~200 | 200 | 50 |
| Example 27 | — | — | 160 | — | — | 170 | — | — | 170 | — | — | — | — | — | 150~200 | 350 | 70 |
| Example 28 | — | — | 30 | — | — | — | — | — | — | — | — | — | — | — | 150~200 | 100 | 70 |
| Example 29 | — | — | 150 | — | — | — | — | — | — | — | — | — | — | — | 150~200 | 200 | 100 |
| Example 30 | — | — | 130 | — | — | 370 | — | — | — | — | — | — | — | — | 150~200 | 350 | 100 |
| Example 31 | — | — | 140 | — | — | 280 | — | — | 780 | — | — | — | — | — | 150~200 | 600 | 100 |
| Example 32 | — | — | 60 | — | — | 130 | — | — | 310 | — | — | — | — | — | 150~200 | 350 | 80 |
| Example 33 | — | — | 130 | — | — | 370 | — | — | — | — | — | — | — | — | 150~200 | 250 | 50 |
| Comparative Example 10 | — | — | 30 | — | — | — | — | — | — | — | — | — | — | — | 150~200 | 100 | 3 |
| Comparative Example 11 | — | — | 30 | — | — | 30 | — | — | 40 | — | — | 50 | — | — | 150~200 | 200 | 8 |
| Comparative Example 12 | — | — | 130 | — | — | 370 | — | — | — | — | — | — | — | — | 150~200 | 350 | 100 |

Note:
[(1)]Feed quantity of liquid: Parts by weight of the liquid for the polyolefin resin 100 parts by weight.
[(2)]Position in the Kneader: The numericals 1 through 14 indicate the location positions of pressure meters shown in FIG. 7 through FIG. 10.

TABLE 7

| | Internal Pressure in the Kneader (kg/cm$^2$) | | | | | | | | | | | | | |
|---|---|---|---|---|---|---|---|---|---|---|---|---|---|---|
| | Position on the Kneader[(1)] | | | | | | | | | | | | | |
| | 1 | 2 | 3 | 4 | 5 | 6 | 7 | 8 | 9 | 10 | 11 | 12 | 13 | 14 |
| Example 26 | 0.0 | 2.8 | 2.0 | 0.8 | 0.0 | 0.0 | 0.0 | 0.0 | 0.0 | 0.0 | 0.0 | 0.0 | 0.0 | 0.0 |
| Example 27 | 0.0 | 1.4 | 0.0 | 0.0 | 0.0 | 0.0 | 0.0 | 0.0 | 0.0 | 0.0 | 0.0 | 0.0 | 0.0 | 0.0 |
| Example 28 | 0.0 | 2.9 | 2.4 | 0.0 | 0.0 | 0.0 | 0.0 | 0.0 | 0.0 | 0.0 | 0.0 | 0.0 | 0.0 | 0.0 |
| Example 29 | 0.0 | 1.5 | 0.5 | 0.0 | 0.0 | 0.0 | 0.0 | 0.0 | 0.0 | 0.0 | 0.0 | 0.0 | 0.0 | 0.0 |
| Example 30 | 0.0 | 1.3 | 0.4 | 0.0 | 11.2 | 10.1 | 9.8 | 9.3 | 8.1 | 7.3 | 5.9 | 4.5 | 3.4 | 1.8 |
| Example 31 | 0.0 | 0.4 | 0.0 | 0.0 | 2.5 | 1.2 | 0.6 | 11.4 | 10.1 | 9.9 | 8.6 | 5.9 | 3.1 | 1.3 |
| Example 32 | 0.0 | 1.3 | 0.2 | 0.0 | 2.5 | 1.8 | 0.7 | 5.5 | 4.5 | 4.4 | 4.3 | 4.1 | 3.6 | 3.0 |
| Example 33 | 0.0 | 0.3 | 0.0 | 0.0 | 1.3 | 0.6 | 0.5 | 0.3 | 0.2 | 0.0 | 0.0 | 0.0 | 0.0 | 0.0 |
| Comparative Example 10 | 0.0 | 2.3 | 7.5 | 10.5 | 5.7 | 2.2 | 0.2 | 0.0 | 0.0 | 0.0 | 0.0 | 0.0 | 0.0 | 0.0 |
| Comparative Example 11 | 0.0 | 0.0 | 2.4 | 4.1 | 0.0 | 10.3 | 15.2 | 0.4 | 13.2 | 14.1 | 0.2 | 22.5 | 30.1 | 25.1 |
| Comparative Example 12 | 1.7 | 15.2 | 11.2 | 8.5 | 40.6 | 31.2 | 30.1 | 25.3 | 23.5 | 20.1 | 16.7 | 13.1 | 10.1 | 6.7 |

Note:
[(1)]Position in the kneader: The numericals 1 through 14 indicate location positions of pressure meters shown in FIG. 7 through FIG. 10.

Applicability in Industry

As described in detail above, by performing the method according to the present invention, wherein a starving state is created in an internal section of the kneader at a polyolefin resin feed section and a liquid feed section, and an initial kneading section, it is possible to obtain a uniform high yield of polyolefin solution, without creating a backflow of the liquid. The polyolefin solution obtained by the method according to the present invention can be used for manufacturing various types of polyolefin formed objects.

In addition, the method according to the present invention can prevent a backflow of a liquid, and can continuously obtain a high yield of a uniform polyolefin solution, as a result of a specific pressure distribution in the kneader. The polyolefin solution obtained by a method according to the present invention in the manner described above can be used for manufacturing various types of polyolefin formed objects, and is especially suitable for forming microporous membranes.

We claim:

1. A method of manufacturing a polyolefin solution, comprising the steps of:

providing a continous kneader having a self-cleaning action, and having a plurality of internal sections including a polyolefin resin feed section, at least one solvent liquid feed section, and a section in which a kneading of a polyolefin resin and a solvent liquid is initially performed;

kneading the polyolefin resin with the solvent liquid using the kneader, and maintaining the polyolefin resin feed section, the solvent liquid feed section and the section in which kneading of the polyolefin resin and the solvent liquid is initially performed, in a starved condition.

2. The method defined in claim 1, further comprising the steps of:

providing a plurality of solvent liquid feed sections;

disposing at least one of the solvent liquid feed sections downstream of the polyolefin resin feed section, and simultaneously maintaining the polyolefin resin feed section, a solvent liquid feed section located farthest upstream, and the section in which the kneading of the solvent liquid and the polyolefin resin is initially performed, in a starved condition.

3. The method defined in claim 1, further comprising the steps of:

disposing the solvent liquid feed section downstream of the polyolefin resin feed section, and simultaneously maintaining the polyolefin resin feed section, the solvent liquid feed section, and the section in which the kneading of the solvent liquid and the polyolefin resin is initially performed, in a starved condition.

4. The method defined in claim 1, further comprising the steps of providing the kneader with at least one additional internal section located between the polyolefin resin feed section and a solvent liquid feed section located farthest upstream; and maintaining the at least one additional internal section at a pressure that is greater than an internal pressure of the kneader at the solvent liquid feed section located farthest upstream.

5. The method defined in claim 1, wherein the at least one solvent liquid feed section comprises at least two solvent liquid feed sections connected together by an additional internal section, and being located downstream of the polyolefin resin feed section; further comprising the step of maintaining at least the additional internal section at a pressure that is greater than an internal pressure of the kneader at the solvent liquid feed section located farthest upstream.

6. The method defined in claim 5, further comprising the step of maintaining the additional internal section at a pressure that is greater than an internal pressure of the kneader at the solvent liquid feed section located immediately downstream of the polyolefin resin feed section.

7. The method defined in claim 1, wherein the continuous kneader comprises a co-rotating twin screw mixer.

8. The method defined in claim 1, wherein the polyolefin resin contains more than 5% by weight of a component having a molecular weight of at least 1×10$^6$.

9. The method defined in claim 1, wherein the polyolefin resin comprises one of an ultra high molecular weight polyethylene containing more than 5% by weight of a component having a molecular weight of at least 1×10$^6$, and a composition of the ultra high molecular weight polyethylene and a high density polyethylene.

10. The method defined in claim 1, wherein the solvent liquid is selected from the group consisting of aliphatic hydrocarbon, cyclic hydrocarbon and mineral oil.

11. The method defined in claim 1, wherein the quantity of the liquid is 15 to 2000 parts by weight per 100 parts per weight of the polyolefin resin.

12. A method of manufacturing a polyolefin solution, comprising the steps of:

provichng a continuous kneader having a self-cleaning action, and having a plurality of internal sections including a polyolefin resin feed section, at least one solvent liquid feed section located downstream of the polyolefin resin feed section, and an additional section located between the solvent liquid feed section and the polyolefin resin feed section; and maintaining the additional section at an internal pressure that is greater than an internal pressure of the kneader at the solvent liquid feed section located farthest upstream.

13. The method defined in claim 12, wherein the at least one solvent liquid feed section comprises at least two solvent liquid feed sections located downstream of the polyolefin resin feed section and being connected to each other with a further internal section; further comprising the step of maintaining the further internal section at a pressure that is greater than a pressure in the kneader at the solvent liquid feed section located immediately downstream.

14. The method defined in claim 13, further comprising the step of maintaining the further internal section at a pressure that is greater than a pressure in the kneader at the two solvent liquid feed sections.

15. The method defined in claim 12, wherein the continuous kneader comprises a co-rotating twin screw mixer.

16. The method defined in claim 12, wherein the polyolefin resin contains more than 5% by weight of a component having a molecular weight of at least $1 \times 10^6$.

17. The method defined in claim 12, wherein the polyolefin resin comprises one of an ultra high molecular weight polyethylene containing more than 5% by weight of a component having a molecular weight of at least $1 \times 10^6$, and a composition of the ultra high molecular weight polyethylene and a high density polyethylene.

18. The method defined in claim 12, wherein the solvent liquid is selected from the group consisting of aliphatic hydrocarbon, cyclic hydrocarbon and mineral oil.

19. The method defined in claim 12, wherein the quantity of the liquid is 15 to 2000 parts by weight per 100 parts per weight of the polyolefin resin.

* * * * *